United States Patent
Adams

(10) Patent No.: US 9,714,300 B2
(45) Date of Patent: Jul. 25, 2017

(54) CONTINUOUS EMULSION POLYMERIZATION REACTOR AND PIGGING SYSTEM

(71) Applicant: CELANESE INTERNATIONAL CORPORATION, Irving, TX (US)

(72) Inventor: David Adams, Bad Soden (DE)

(73) Assignee: CELANESE INTERNATIONAL CORPORATION, Irving, TX (US)

(*) Notice: Subject to any disclaimer, the term of this patent is extended or adjusted under 35 U.S.C. 154(b) by 65 days.

(21) Appl. No.: 14/647,713

(22) PCT Filed: Nov. 22, 2013

(86) PCT No.: PCT/US2013/071464
§ 371 (c)(1),
(2) Date: May 27, 2015

(87) PCT Pub. No.: WO2014/085248
PCT Pub. Date: Jun. 5, 2014

(65) Prior Publication Data
US 2015/0315301 A1 Nov. 5, 2015

Related U.S. Application Data

(60) Provisional application No. 61/731,213, filed on Nov. 29, 2012.

(51) Int. Cl.
C08F 2/00 (2006.01)
C08F 2/01 (2006.01)
(Continued)

(52) U.S. Cl.
CPC ............ *C08F 2/01* (2013.01); *B01J 19/1831* (2013.01); *B01J 19/1837* (2013.01);
(Continued)

(58) Field of Classification Search
CPC ........ B01J 19/00; B01J 19/18; B01J 19/1812; B01J 19/1818; B01J 19/1831; B01J 19/24; B01J 19/2415; B01J 19/243; B01J 19/2435; B01J 2219/00002; B01J 2219/00027; B01J 2219/0003; B01J 2219/00049;
(Continued)

(56) References Cited

U.S. PATENT DOCUMENTS 3,425,083 A   2/1969   Wennerberg et al.
3,682,186 A   8/1972   Howe
(Continued)

FOREIGN PATENT DOCUMENTS

WO   2006048408 A2   11/2006

OTHER PUBLICATIONS

International Search Report and Written Opinion issued in corresponding PCT/US2013/071464 on Mar. 25, 2014.

*Primary Examiner* — Natasha Young
(74) *Attorney, Agent, or Firm* — Roberts Mlotkowski Safran Cole & Calderon P.C.

(57) ABSTRACT

The invention relates to continuous polymerization apparatus comprising a tubular reactor with a continuous loop section (32), a secondary line section (33) and a pigging system (39) that allows for cleaning of both sections of the reactor in a single continuous pass without manual removal of the pig.

15 Claims, 3 Drawing Sheets

(51) Int. Cl.
*B01J 19/00* (2006.01)
*B01J 19/18* (2006.01)
*B01J 19/24* (2006.01)

(52) U.S. Cl.
CPC ......... *B01J 19/243* (2013.01); *B01J 19/2435* (2013.01); *B01J 2219/00033* (2013.01); *B01J 2219/00094* (2013.01); *B01J 2219/00164* (2013.01); *B01J 2219/00247* (2013.01); *B01J 2219/24* (2013.01)

(58) Field of Classification Search
CPC .... B01J 2219/00051; B01J 2219/00074; B01J 2219/00087; B01J 2219/00094; B01J 2219/00164; B01J 2219/000245; B01J 2219/00247; C08F 2/00; C08F 2/01
See application file for complete search history.

(56) References Cited

U.S. PATENT DOCUMENTS

| | | | |
|---|---|---|---|
| 7,261,863 B2* | 8/2007 | Adams | B01J 19/2435 15/104.061 |
| 7,858,715 B2* | 12/2010 | Adams | B01J 19/2435 422/132 |
| 7,897,115 B2* | 3/2011 | Adams | B01J 19/002 15/104.061 |
| 7,956,137 B2* | 6/2011 | Adams | B01J 19/2435 134/166 R |
| 2001/0022951 A1 | 9/2001 | Adams | |
| 2007/0258868 A1 | 11/2007 | Adams | |
| 2008/0221283 A1 | 9/2008 | Adams | |
| 2012/0208960 A1 | 8/2012 | Marissal | |

* cited by examiner

CONTINUOUS EMULSION POLYMERIZATION REACTOR AND PIGGING SYSTEM

CROSS-REFERENCE TO RELATED APPLICATIONS

The present Application is a U.S. National Phase of PCT/US2013/071464, now WO/2014/085248, filed on Nov. 22, 2013 claiming priority to the provisional U.S. application No. 61/731213, filed on Nov. 29, 2012. The disclosure of the PCT Application is hereby incorporated by reference into the present Application.

FIELD OF THE INVENTION

The invention relates to pigging systems for continuous polymerization reactors, more specifically, pigging systems for emulsion polymerization reactors.

BACKGROUND OF THE INVENTION

One type of continuous tubular emulsion polymerization reactor comprises a first section with a closed circulation loop, a driving means, e.g. a circulation pump, for circulating a reactor charge within the circulation loop, and a discharge connected to a secondary line section. Water phase, or another suitable carrier, monomers, and optionally stabilizers are continuously fed to the loop and circulated. Polymer emulsion is continuously drawn off at the same rate at which the water phase, monomers and initiators (if used) are fed into the reactor.

Such types of reactors are discussed in WO 2007/031478, incorporated herein by reference. This publication describes that such reactors are particularly suitable for the production of polymers derived from vinyl and/or acrylic monomers, used for instance in paints or adhesives.

However, a problem encountered in polymerization processes employing a tubular reactor, including the one described above, is the formation of deposits or "fouling" from the reaction products on the internal wall of the reactor. These deposits lead to a need for an increased delivery pressure from the circulation pump and impair heat transfer from the reaction medium to, e.g., a coolant in a jacket surrounding the reactor tube, thus leading to higher (and often deleterious) reactor temperatures or necessitating either an increased coolant circulation rate, a lower coolant temperature, or a reduced rate of production so as to match the heat removal.

A further general disadvantage of a fouled reactor is the reduction of volume, increasing the shear on the emulsion. This reduction in volume shifts the process conditions which may have been optimized on a clean reactor. In any case, product properties will drift, nullifying the advantages of consistency of production expected from continuous reactors.

One way of cleaning the inside of tubes or pipework is the use of a cleaning member or pig which is forced through the tube. German patent application 3233557, for instance, describes various ways of using a pig for cleaning the internal wall of a tubular reactor. In one embodiment (illustrated in FIG. 1 of the application), two ball valves are provided in the reactor tube for receiving and launching one or more pigs. The reaction product is used to drive the pig and leaves the reactor after the pig has passed the outlet. Thus, the reaction product is not and cannot be re-circulated, rendering this configuration unsuitable for continuous polymerization. In a further embodiment (FIG. 2), scraper pigs may be passed through the pump. This method imposes severe limitations on the shape of the pig and the type of pump used. For instance, the use of a positive displacement type pump is not possible.

It is noted that U.S. Pat. No. 3,425,083 discloses an endless pipe which has a bent form allowing a cleaning member to circulate constantly through the pipe and past its inlet and outlet for a liquid medium. The outlet has a smaller capacity than the inlet, so that part of the liquid medium is returned from the outlet through a return portion of the pipe to and past the inlet for recycling. No means are provided for removing the cleaning member or for interrupting its circulation. Further, the pipe is intended for heating liquids like milk and not for cooling reacting emulsions. In fact, reactors are not mentioned at all.

U.S. Pat. No. 3,682,186 discloses an apparatus for bypassing scrapers or product displacers around a pipeline booster or compression station. The main line is provided with two check valves for receiving and launching a pig. Loop reactors are not mentioned.

Thus a continuous tubular emulsion polymerization reactor utilizing a pig system that allows for automated reactor cleaning without shutting down the polymerization process would be beneficial. In addition, for a two stage reactor with a circulation loop stage and a secondary line stage, it would be useful if both stages could be pigged by a single pig without interruption or manual intervention to retrieve the pig for the secondary stage cleaning. Such an automated system would be more efficient and eliminate the safety concerns introduced by a manual intervention to retrieve the pig.

SUMMARY OF THE INVENTION

An object of the present invention is a continuous two-stage polymerization reactor with a circulating loop section and a secondary line section, said continuous polymerization reactor employing a pig for cleaning the reactor. The system allows simple removal of the pig from the two-stage reactor without the necessity of shutting down the polymerization process, which affords great freedom in selecting the type of circulation pump and material and shape of the pig, and which enables total control over the launching of the pig substantially independent of the reaction medium flow. This is achieved by use of a reactor of the type described above, which may further comprise an orifice to allow the pig to by-pass the circulation pump and enter the secondary line section, a pig receiving station or pig box which accommodates the pig between cleaning operations, and valves for directing the pig into the pig receiving station. The arrangement of valves and tubes and the orifice allows the pig to pass seamlessly and without interruption from the circulating loop into the secondary line section and back to the starting point without passing through the pump and without interrupting the polymerization.

Thus, in one embodiment, the continuous polymerization apparatus comprises a tubular reactor comprising (1) a circulating loop section and (2) a secondary line section having one end connected to a discharge opening of the loop section and a polymer outlet at its other end; one or more inlets though which a polymerizable monomer charge can be supplied to the tubular reactor; a pump for continuously circulating the monomer charge within the circulating loop section under conditions to effect polymerization thereof; a pig for intermittently cleaning the tubular reactor; a pig receiving station which accommodates the pig between cleaning operations; and flow control devices operable to connect the pig receiving station to the tubular reactor so that during a cleaning operation the pig leaves the pig receiving station and passes through and cleans both the circulating loop section and the secondary line section of the reactor. In another embodiment, a discharge side of the pump is in fluid communication with the circulating loop section by way of a first flow control devices and with the pig receiving station through a second flow control devices so that, when the first flow control device is open, a polymerizable monomer charge can circulate through the loop section and. when the second flow control device is open, the pig is launched from the pig receiving station. The pig might be launched at intervals ranging, for example, from 10 to 20 minutes. In another embodiment, part of the tubular reactor, i.e., either or both the first loop section and/or the secondary line section, forms at least one helical coil.

In certain embodiments, the circulating loop can comprise one or more inlets for raw material. In other embodiments, the secondary line section has a volume of less than twice the volume of the closed loop section, preferably from 50%-100% of the volume of the circulating loop section. If desired, the discharge rate and the circulation rate in the circulating loop section can be balanced to result in a predetermined monomer content, for example, less than 12 wt. %, in the loop section.

Another aspect of the invention can involve a continuous emulsion polymerization apparatus comprising a tubular reactor comprising (1) a circulating loop section and (2) a secondary line section having one end connected to a discharge opening of the loop section and a polymer outlet at its other end; one or more inlets though which a polymerizable monomer charge can be supplied to the tubular reactor; a pump for continuously circulating the monomer charge within the circulating loop section under conditions to effect polymerization thereof; a pig for intermittently cleaning the tubular reactor; an orifice allowing the tubular reactor to be in fluid connection with a suction side of the circulation pump; a vent line connecting the tubular reactor downstream of the orifice to between the orifice and the circulating pump; a pig receiving station which accommodates the pig between cleaning operations; and flow control devices operable to connect the pig receiving station to the tubular reactor so that during a cleaning operation the pig leaves the pig receiving station and passes through and cleans both the circulating loop section and the secondary line section of the reactor. As the pig passes the orifice at least some of the reactor charge ahead of the pig may pass into the vent line. In one embodiment, the vent line comprises a valve that is opened as the pig approaches.

Yet another aspect of the invention involves a continuous emulsion polymerization apparatus comprising a tubular reactor comprising (1) a circulating loop section and (2) a secondary line section having one end connected to a discharge opening of the loop section and a polymer outlet at its other end; one or more inlets though which a polymerizable monomer charge can be supplied to the tubular reactor; a pump for continuously circulating the monomer charge within the circulating loop section under conditions to effect polymerization thereof; a pig for intermittently cleaning the tubular reactor; an orifice allowing the tubular reactor to be in fluid connection with a suction side of the circulation pump and positioned on the inner side of a curved portion of the tubular reactor such that the pig does not contact the orifice due to centrifugal force keeping the pig on the outside of said curved portion of the tubular reactor; a pig receiving station which accommodates the pig between cleaning operations; and flow control devices operable to connect the pig receiving station to the tubular reactor so that during a cleaning operation the pig leaves the pig receiving station and passes through and cleans both the circulating loop section and the secondary line section of the reactor. The orifice may be further positioned between the circulating loop section and the secondary line section.

Another embodiment of the invention can involve a process for preparing an emulsion polymer by means of the polymerization apparatuses described above.

BRIEF DESCRIPTION OF THE DRAWINGS

The invention is described in detail below with reference to the appended drawings, wherein like numerals designate similar parts.

DETAILED DESCRIPTION

Continuous Emulsion Polymerization Reactor

Figure 1:
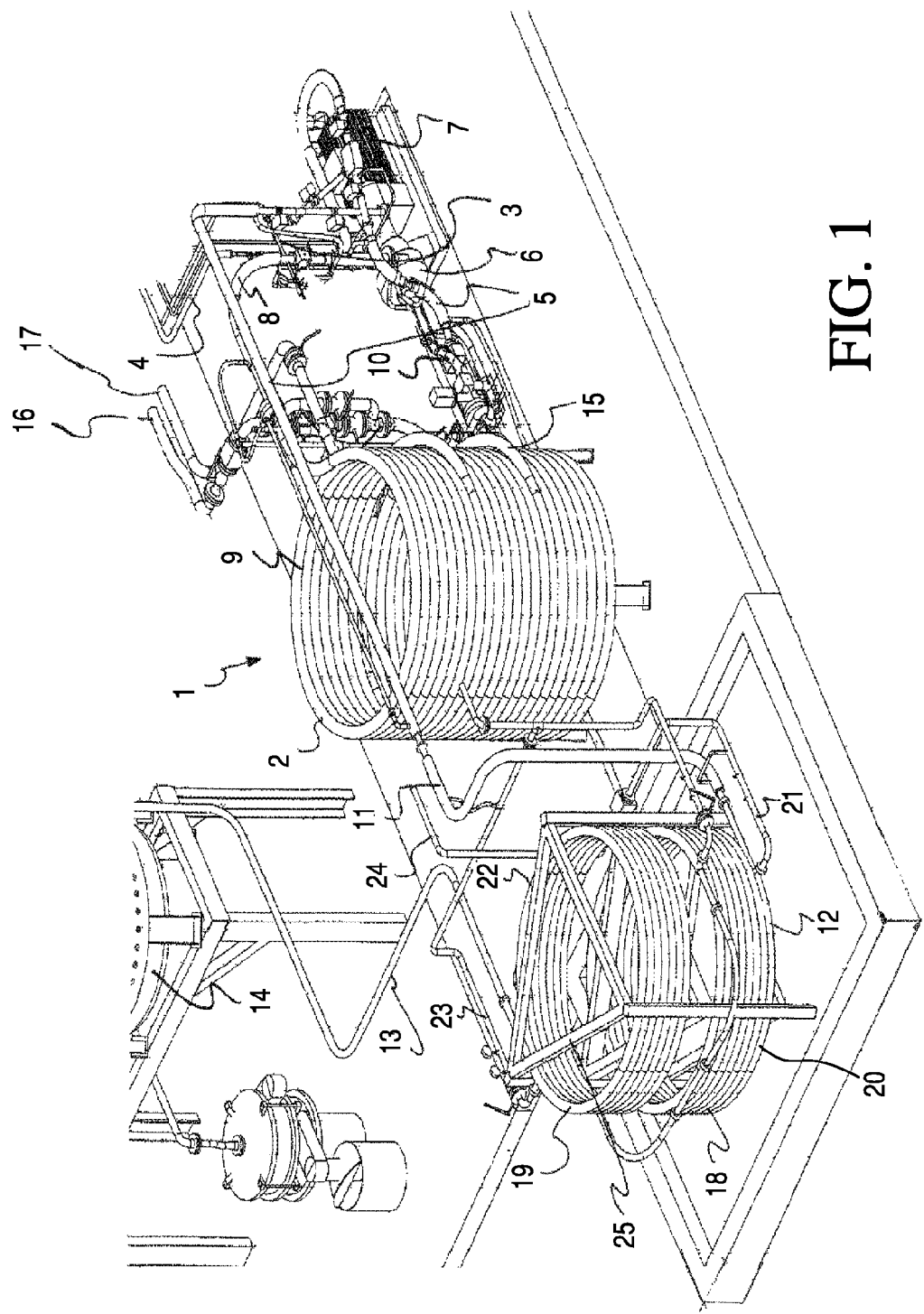
FIG. 1 is a diagram of a polymerization apparatus according to one embodiment of the present invention.

The present invention is directed to a tubular reactor for effecting continuous emulsion polymerization, in which the reactor is provided with a pigging system that allows intermittent cleaning of the entire reactor in a single continuous pass without manual removal of the pig.

The tubular reactor comprises a circulating loop section and a secondary line section having one end connected to a discharge opening of the circulating loop section and a polymer outlet at its other end. In operation, a reactor charge comprising fresh monomer and water phase is continuously supplied to the loop section and is circulated within the loop section by means of a pump. The reactor charge circulating within the loop section is maintained under polymerization conditions and a polymerized charge is continuously discharged from the loop section into the secondary line section at a rate substantially less than the rate of circulation of the reactor charge within the loop section but substantially the same as the rate at which the reactor charge is supplied to the loop section. The discharge rate and the circulation rate can be balanced to achieve low residual monomer content. Preferably the secondary line section has a volume of less than twice the volume of the closed loop section. Optionally, the first loop section and/or the secondary line section is coiled.

The secondary line section can, for example, be provided with at least two separate cooling jackets in serial arrangement. This allows optimization of the different stages of polymerization as the reactor charge passes through the secondary line section. In this way, the first part of the secondary line section can be cooled to a lesser extent than a subsequent part of the secondary line section. The first part can for instance be cooled to a relatively high temperature of 70° C. or higher to maximize polymerization, whereas the subsequent part can be cooled to a greater extent, e.g., to 55° C. or less, so that the finished polymer emulsion is discharged to a storage tank at a reasonably low temperature.

Optionally, the secondary line section may have a diameter which is larger than the diameter of the line forming the closed loop section. With a larger diameter, the reactor charge will move along the secondary line section at a relatively slow speed. In another possible embodiment, the diameter of the secondary line section can be smaller than the diameter of the pipeline forming the circulating loop section, which will increase the shear rate in the former. In a preferred embodiment, the diameter of the secondary line section is the same as the diameter of the circulating loop section. Even with the same diameter pipe, the flow rates of the fluid in the two sections will differ as a consequence of forced circulation in the loop section due to the pump, while the flow velocity in the secondary stage is determined only by the sum of the feed rates. For example, in one embodiment, the speed of the reactor charge in the loop section is on the order of 3.5 m/s, while the speed of the reactor charge in the secondary line section is on the order of 0.2 m/s.

The polymerization of monomers can take place in aqueous suspension and preferably the raw materials are provided by separate feed streams. These streams introduce monomer and optionally an aqueous solution of stabilizer known as the water phase or, e.g., a pre-emulsion of monomer and water with stabilizer and an aqueous stabilizer solution in a separate small stream. At the start of the reaction the reactor is filled with water phase made up in a solution tank. Other additions are also possible, particularly finished emulsion polymer (of the same or a different composition) from a previous run, optionally diluted to any concentration.

Agitation in the reactor can be provided by virtue of an in-line circulation pump. In some embodiments, shortly after the feed streams start to flow, the monomers begin to react and heat is generated. The temperature can be stabilized by cooling means, usually by controlled circulation of a cooling fluid (e.g. water) through a cooling jacket. In some embodiments, the product flows to the cooling tank, where, if necessary, residual monomer can be further converted to polymer by adding more initiators to the copolymer dispersion. After cooling, the emulsion polymer can be filtered to remove any oversize particles or gritty material in a strainer and transferred to the product storage tank.

Optionally, the polymerization process can be carried out under pressure, for instance under a pressure between 1 to 300 bar, but preferably between 5 to 100 bar, more preferably between 10 to 20 bar. Alternatively, the polymerization may be carried out at ambient pressure.

One example of a continuous emulsion polymerization reactor is shown in FIG. 1, in which the reactor 1 comprises a circulation loop 2 with a monomer inlet 3, a water phase inlet 4, and a discharge outlet 5 for finished product. A circulation pump 6 driven by a motor 7 serves as a driving means for circulating a reactor charge within the circulation loop 2, via line 8 to the upper section of the coiled part 9 of the circulation loop 2. In the coiled part 9, the reactor charge flows down and via line section 10 back to the circulation pump, 6 where the main part of the reactor charge is re-circulated again, except for the part that is discharged via outlet 5. The discharged reactor charge has a residual monomer content of about 5% by weight. To obtain a continuous polymerization process, the outlet of the circulation loop 2 is such that the outflow rate equals the inflow rate of the raw materials and is substantially less than the flow rate of the re-circulated material.

The reactor 1 further comprises a product take-off line 11 leading from the outlet 5 of circulation loop 2 to a coiled second line section 12. A discharge line 13 leads from the coiled section 12 to a cooling tank 14. The volume of the coiled section 12 is about equal to the volume of the circulation loop 2.

The coiled tube of the circulation loop 2 is covered by a hollow cooling jacket 15, through which cooling water flows. The cooling jacket 15 is connected to a cooling water inlet 16 and a cooling water outlet 17.

The coiled section 12 is similarly cooled and has a lower part 18 and a separately cooled upper part 19. To this end, the lower part 18 is provided with a cooling jacket 20, connected to a water inlet 21 and a water outlet (not shown). Similarly, the upper part 19 is provided with a separate cooling jacket 22, connected to another water outlet 23 and a water inlet 24. The lower part 18 of the coiled section 12 is connected to the discharge outlet 5 of the circulation loop 2 and is cooled to a lesser extent than the subsequently cooled upper part 19 of the coiled section 12. The coiled section 12 is hung in a frame 25.

Pigging System

In operation, the reactor described above gradually becomes fouled as deposits form on the tubular walls of the reactor. It is therefore necessary to periodically clean the walls of the reactor and in the present apparatus this is achieved by means of a "pig". As used herein, the term "pig" comprises any element suitable for removing deposits and the like from the inner wall of tubular reactors and being carried through the reactor with a fluid stream. Other common terms for such an element are, e.g., "scraper" and "cleaning member". Pigs usually are formed of soft or semi-hard natural or synthetic material, e.g. rubber or polyurethane. Also, pigs or scrapers with (flexible) metal parts or metal brushes as well as combinations of metal and a soft or semi-hard natural or synthetic material can be used. In one embodiment, the pig can comprise a stainless steel body containing powerful magnets and rubber rings at each end which fully contact the inner profile of the reactor tube. In one embodiment, the pig has a fixed diameter. In another embodiment, the diameter of the pig can change as necessary to contact the inner walls of the reactor. Of the numerous possible shapes, cylinders, cylinders with round edges as well as cylindrical bodies with thick lips and/or thick strips on the outer circumference are preferred. Dumbbell shaped cylindrical pigs have two scraping surfaces, as opposed to spherical surfaces which have only one. Also, the front scraping surface is (or can be) a leading edge scraper. A spherical pig has only one trailing edge. The design of the pig and the materials used depend, among other things, on the type of deposit and the tolerances and radii of the reactor tube. Incidentally, it is noted that the amount of wear of the pig can be determined from the time needed for one cleaning cycle (a worn pig will require more time to complete a cycle). Preferred circulation pumps can be, inter alia, positive displacement pumps.

During normal operation of the reactor, the pig is accommodated in a pig receiving station which is mounted externally to the circuit formed by the loop section and its associated pump but which is connected to both the loop section and the secondary line section by way of a series of flow control devices. The flow control devices are arranged so that, when it is desired to clean the reactor, hydraulic pressure is applied to the pig so that the pig is removed or "launched" from the pig receiving station and then forced through the loop section and then the secondary line section by-passing the pump before returning to the pig receiving station.

In the present apparatus, pigging of the reactor described can be fully automated and the pig can be replaced either during operation, simply by opening up the pig receiving station without the flow of the reaction medium being disturbed, or during normal (e.g., weekly) maintenance, whichever is considered desirable. More importantly, however, the presence of a pig no longer limits the range of suitable circulation pumps, allowing the use of, e.g., pumps which impose low shear on the reaction medium. This is because the action of the pigging prevents the narrowing of the reaction pipe and therefore the pressure drop across the pump remains constant for extended production runs. Low shear pumps include those which have a limited pressure differential capability. In addition, the shape and material of the pig can be fully optimized for the reactor tube employed and the nature of the deposits.

The fact that the pig receiving station is not part of the main reactor tube and that the pig is actually removed from the reactor medium flow (as opposed to, e.g., remaining between two ball valves in the main flow) enables the operator of the reactor according to the present invention to launch the pig as and when he sees fit. At times the pig is not passing through the reactor, it can be stored in the pig receiving station or pig box.

The pig receiving station may take the form of a side track somewhere in the loop reactor. For example, the pig receiving station may be located in a side tube attached to the main reactor tube by the opening and exit of the side tube. It is preferred that the pig receiving station is connected to the main reactor tube between the outlet of the secondary line section and the start of the loop section. An advantage of this embodiment resides in the launch opening of the pig receiving station being positioned close to the delivery side of the circulation pump, thus providing thrust during the launching of the pig and improving the reliability of the launching system. Locating the pig receiving station near the end of the secondary line section and connected to the beginning of the loop section also allows for the cleaning of both the loop section and the secondary line section of the reactor in a single continuous pass of the pig without the need for manually removing the pig.

The pig can be launched using, e.g. in the case of polymerization of vinyl monomers in aqueous suspension, either the emulsion in the reactor or the water phase feed. Instead of a diversion of the water phase to launch the pig, a controlled "shot" of water or some other compatible fluid could be used to launch the pig. After launch, the pig can clean the loop section of the reactor, followed by the secondary line section before returning to the pig receiving station.

In one embodiment, the suction side of the circulation pump is in fluid communication with the tubular reactor adjacent the discharge opening of the circulating loop section by way of an orifice in the tubular reactor and a connecting tube extending perpendicular to the main flow through the reactor. The discharge side of the circulation pump can then be connected via a first flow control device to the start of the loop section and via a second flow control device to the pig receiving station. A third flow control device can also control the flow from the pig receiving station to the loop section. Thus, during normal operation of the reactor, with the first flow control device open and the second and third flow control devices closed, the pump circulates the reactor charge through a first fluid circuit including the circulating loop section, the connecting tube and the pump. To effect a pigging operation, the first flow control device is closed and the second and third flow control devices are opened, so that the discharge from the pump is diverted to the pig receiving station to launch the pig.

When the second and third flow control device is opened and the first flow control device is closed, a second fluid circuit is established including the pig receiving station, the loop section, the connecting tube and the pump. The pig is then forced by the pump through the loop section but, because of the orientation of the connecting tube and the size of the orifice, which is arranged to be less than the size of the pig, the pig cannot pass through the orifice into the connecting tube but instead moves past the orifice to the secondary line section. In one embodiment, the centrifugal force of the pig keeps it away from the orifice. However, most of the fluid that is displaced by the pig as it passes through the loop section flows back to the pump through the connecting tube. An embodiment of the present invention uses a tapered orifice for which the size of the opening increases in the downstream direction.

As the pig passes from the loop section, there is a tendency for the pig to come to a partial halt as its leading end enters the slow moving fluid in the secondary line section. This, in turn, could give rise to the pig stalling in front of the orifice causing partial blockage of the connecting tube and unwanted pressure fluctuations in the system. In one embodiment, this problem is obviated by providing a vent line connecting the secondary line section immediately downstream of the discharge opening of the circulating loop section with the connecting tube. In this way, the fluid immediately ahead of the pig as it passes the orifice can be relieved into the connecting tube. A further flow control device is provided in this vent line which is only opened when the pig approaches. As soon as the pig has been detected to have moved into the secondary line section, the further flow control device in the vent line is closed allowing the pig to be driven through the secondary line section.

The closed loop reactor according to the present invention preferably comprises a reactor tube of which at least a substantial part (e.g., the secondary line section) forms a helical coil. In comparison to the common trombone arrangement of the continuous tube (as disclosed in, e.g., M. Wilkinson and K. Geddes, "An award winning process," Chemistry in Britain, pp. 1050-1053, December 1993) the shape is more appropriate for pigging in that the pig is not forced to make sharp turns, thus reducing the wear of the pig and allowing the use of longer pigs. Furthermore, uncooled joints, which are one of the origins of wall fouling, can be avoided by using an optionally helically coiled continuous tube.

The invention further pertains to a process for preparing (emulsion) polymers by means of the closed circulation loop and secondary line reactor described above. It is preferred that a pig is launched at intervals ranging from 1 to 120 minutes, such as from 5 to 60 minutes, for example from 10 to 20 minutes. Apart from more effective cleaning of the tube walls, regular disturbance of slow moving or static layers of emulsion polymer close to the tube walls will prevent or at least delay the onset of a poorly heat conducting stationary outer layer of polymer.

Some typical commercial monomers suitable for use in the present polymerization process include, e.g., butyl acrylate, methyl methacrylate, styrene, vinyl acetate, Veova 9, Veova 10, Veova 11, ethyl acrylate, 2-ethyl hexyl acrylate, ethylene, and vinyl chloride. The addition reaction is initiated by radicals to give a dispersion of high molecular weight polymer particles usually of 50 to 3000 nm diameter suspended in a medium in which the polymer is insoluble, usually water. Common free radical generators include the sodium, potassium, and ammonium salts of peroxodisulphuric acid, e.g. ammonium peroxodisulphate. Alternatively, redox couples can be used. These consist of an oxidizing agent and a reducing agent. Commonly used oxidizers are the salts of peroxodisulphuric acid and t-butyl hydroperoxide and hydrogen peroxide itself. Reducers are typically sodium sulphite, sodium metabisulphite, sodium formaldehyde sulphoxylate, and sodium dithionate.

Polymerization of monomers in aqueous suspension is preferred and, in that case, raw materials are preferably provided by separate feed streams. These streams introduce fresh monomer and an aqueous solution of stabilizers known as the water phase or, e.g., a pre-emulsion of monomer and water and an aqueous solution in a separate small stream. The reactor is filled at the start of the reaction with water phase made up in a solution tank. Other fillings are possible, particularly with finished emulsion polymer (of the same or different composition) from a previous run, "as is" or diluted to any concentration; water; or an alternative special water phase used for the filling and possibly for the early stage of the run.

Figure 2:
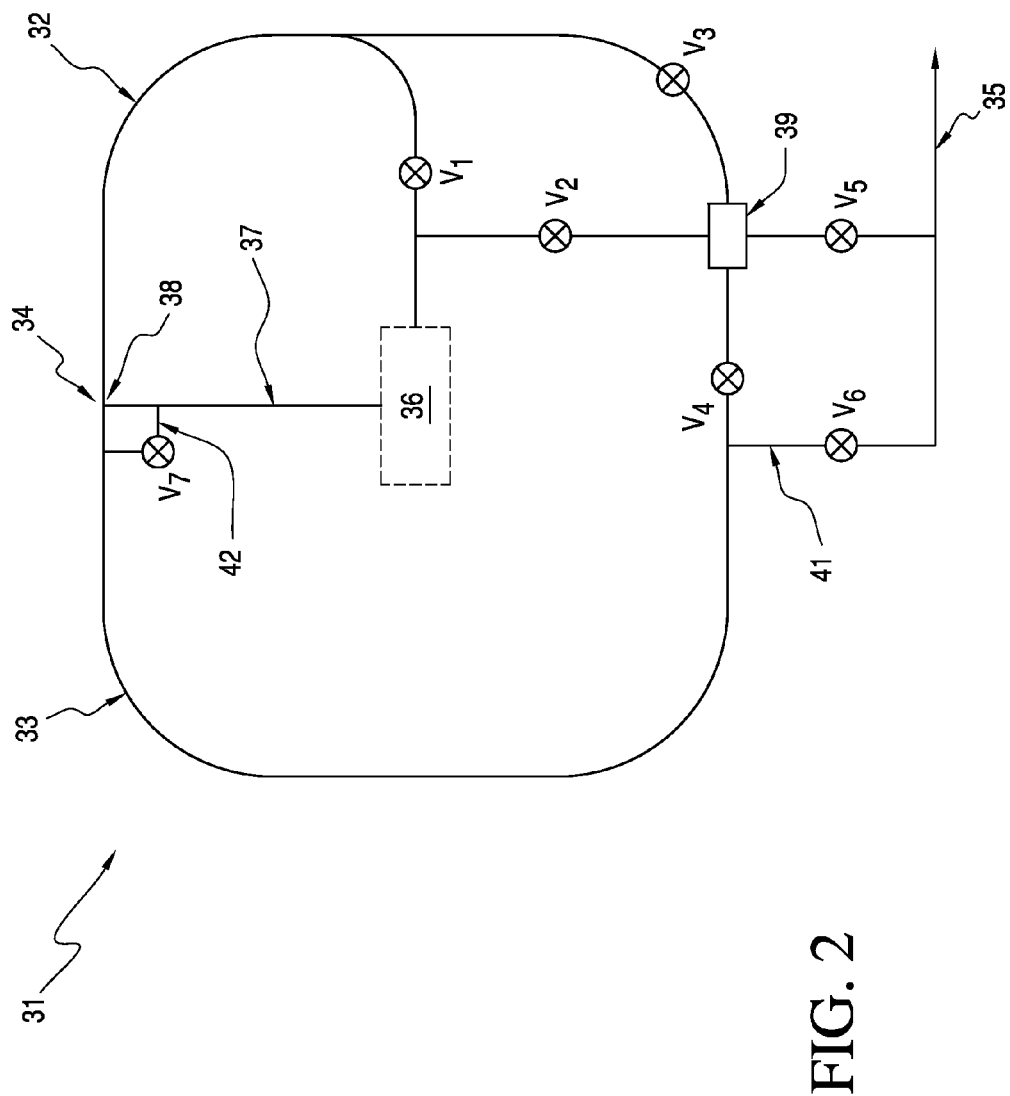
FIG. 2 is a simplified diagram of a polymer apparatus including a pigging system in accordance with one embodiment of the present invention.

One example of a continuous emulsion polymerization apparatus including the pigging system described above is shown schematically in FIG. 2, in which the apparatus comprises a tubular reactor 31 having a circulating loop section 32 and a secondary line section 33 having one end connected to a discharge opening 34 of the loop section 32 and its other end connected to a polymer outlet 35. As shown in FIG. 2, the apparatus further comprises a pump 36 for moving the reactor charge through the circulating loop section 32. At its suction side, the pump 36 is in fluid connection with the loop section 32 by way a connecting tube 37 and an orifice 38 in the wall of the reactor 31 located adjacent the discharge opening 34. At its discharge side, the pump 36 is connected by way of a valve $V_1$ to the input of the loop section 32.

The discharge side of the pump 36 is also connected by way of a valve $V_2$ to a pig receiving station 39 for storing a pig (not shown) between cleaning operations. The pig receiving station is further connected by way of a valve $V_3$ to the circulating loop section 32 downstream of the valve $V_1$. Additional valves $V_4$ and $V_5$ connect the pig receiving station 39 to the secondary line section 33 and the polymer outlet 35 respectively, while a by-pass line 41 controlled by a further valve $V_6$ allows a direct connection between the secondary line section 33 and the polymer outlet 35 by-passing the pig receiving station 39.

During normal operation of the reactor 31 to polymerize a monomer charge, the valves $V_1$ and $V_6$ are open, whereas the valves $V_2$, $V_3$, $V_4$ and $V_5$ are all closed so that the pump 36 continuously circulates the monomer charge through the circulating loop section 32. The monomer charge circulating with the loop section 32 is maintained under polymerization conditions and a polymerized charge is continuously discharged from the loop section through the discharge opening 34 into the secondary line section 33 and then by way of the valve $V_6$ to the polymer outlet 35.

Prior to pigging, the pig is positioned in the pig receiving station 39. When the operator wishes to pig the equipment, the valves $V_2$ and $V_3$ are opened. Then valve $V_1$ is closed which redirects the flow from the pump 36 to the pig receiving station 39. This pushes the pig out of the receiving station and into the circulating loop circuit 32 via the valve $V_3$. When the pig is detected entering the loop section 32, valve $V_1$ is opened and valves $V_2$ and $V_3$ are closed. The pig is thus propelled through the circulating loop section 32 by the pumping action of the circulation pump 36. In the embodiment where the tubular reactor 31 is coiled (not shown), the pig acquires a centrifugal force as it passes through the reactor 31, keeping the pig on the outer wall of the reactor 31 as it passes the discharge opening 34 and the orifice 38. Additionally, the diameter of the orifice 38 can be arranged to be less than the length of the pig. In another embodiment, the diameter of the orifice 38 can be larger than the length of the pig and guide bars are used to prevent entry of the pig into the orifice 38. The pig enters the secondary line section 33 through the discharge opening 34, by-passing the pump 36 while at least some of the reactor charge flows through the orifice 38. The pig then moves through the secondary line section 33 and when the pig is detected approaching the by-pass line 41, valves $V_4$ and $V_5$ are opened and valve $V_6$ is closed. This re-routes the product flow via the pig receiving station 39 and when the pig has entered the receiving station 39, a sensor detects its arrival and the valves $V_4$, $V_5$ and $V_6$ are returned to their original positions in reverse order. This then completes the pigging cycle.

As shown in FIG. 2, a vent line 42 connects the secondary line section 33 immediately downstream of the discharge opening 34 to the connecting tube 37 under the control of a valve $V_7$. Without this vent line the pig would come to a partial halt as its leading end enters the slow moving fluid in the secondary line section 33. This, in turn, would give rise to the pig stalling in front of the orifice 38 causing partial blockage and would be accompanied by unwanted pressure fluctuations. The valve $V_7$ in this vent line is only opened when the pig approaches. As soon as the pig has been detected to have moved into the secondary stage 33, the valve $V_7$ in the vent line is closed allowing the pig to be driven through the secondary stage 33.

Figure 3:
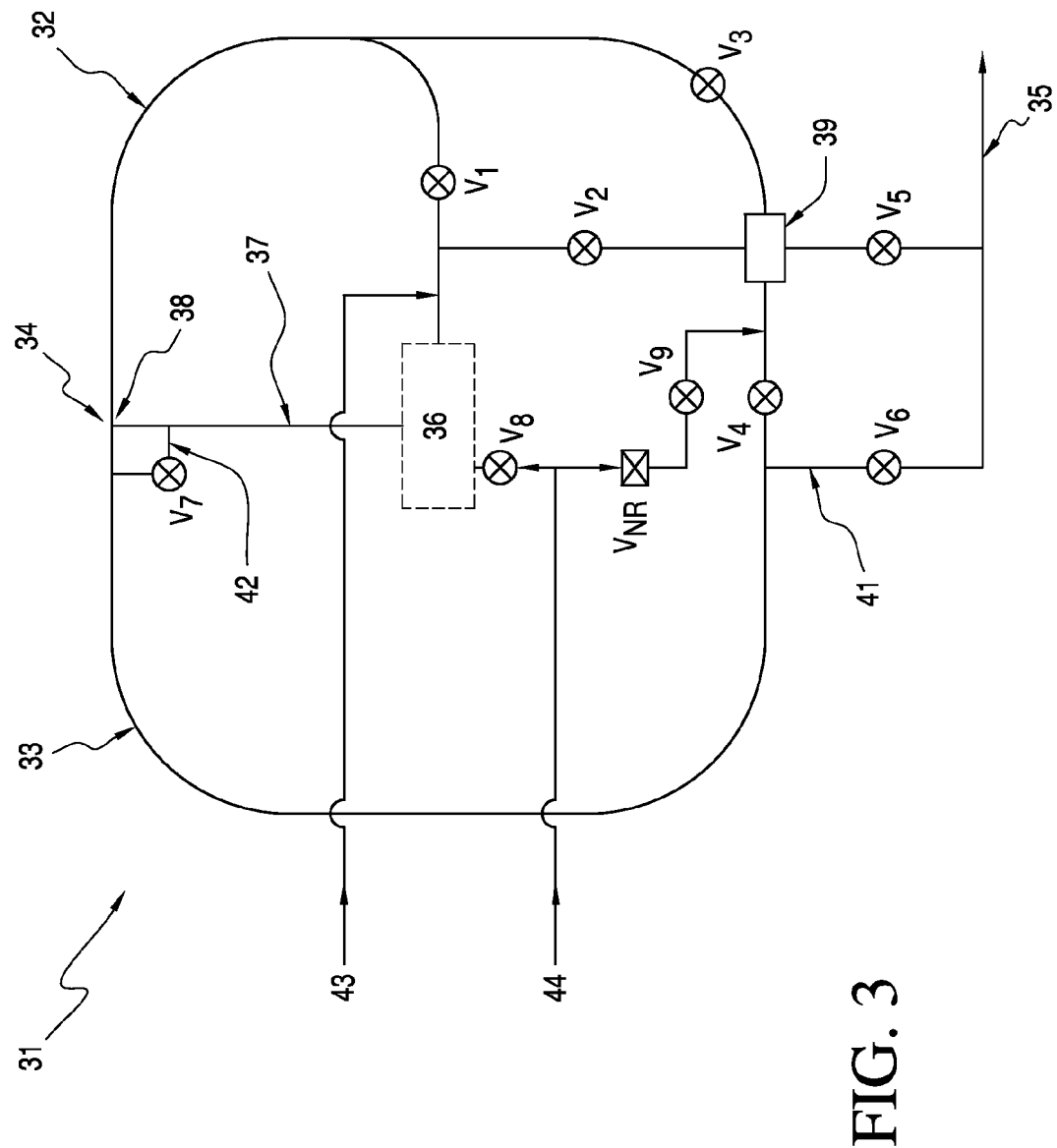
FIG. 3 is a simplified diagram of a polymer apparatus including a pigging system with a pig launch using the water phase inlet in accordance with one embodiment of the present invention.

It will be understood from the foregoing that, in the embodiment of FIG. 2, the pig is launched by diversion of the entire reactor charge flowing through the circulating loop section 32. Another method for pigging the tubular reactor described involves an embodiment in which the pig is launched by diverting the flow of water phase metered into the circulating loop section 32 together with the monomer phase to produce the reactor charge. FIG. 3 shows a depiction of this alternative launch embodiment. The arrangement of valves and reactor are the same as described for FIG. 2 (valves V1 and V2 are now unnecessary, but still optional). However FIG. 3 additionally shows line 43 for the addition of monomers and oxidant (if desired) into the reactor 31 and line 44 for the addition of the water phase into the reactor 31. The line 43 is connected to the discharge side of the pump 36, while the line 44 is connected to the suction side of the pump 36 by way of a valve $V_8$. The line 44 is also connected to the pig receiving station 39 by a non-return valve $V_{NR}$ and another valve $V_9$.

To launch the pig from the pig receiving station 39, valve $V_3$ connecting the receiving station 39 to the circulating loop section 32 is opened. Next, valve $V_9$ is opened and valve $V_8$ is closed, allowing the water phase to flow from line 44 through the pig receiving station 39, thereby pushing the pig into the circulating loop section 32. When the pig is detected in the loop section 32, the valve sequence is reversed. That is, valve $V_8$ is opened, valve $V_9$ is closed, and then valve $V_3$ is closed. When the pig passes through the loop section 32 and the secondary line section 33, the pig can be returned to the pig box in the manner previously described. In this embodiment, the water phase is used to launch the pig, but fluids other than the water phase can be used, including those not otherwise part of the reactor charge, such as compressed gas for example. The successful launching of the pig depends on having a reasonable flow of fluid behind the pig.

I claim:

1. A continuous emulsion polymerization apparatus comprising:
   a tubular reactor comprising (1) a circulating loop section and (2) a secondary line section having one end connected to a discharge opening of the loop section and a polymer outlet at its other end;
   one or more inlets though which a polymerizable monomer charge can be supplied to the tubular reactor;
   a pump for continuously circulating the monomer charge within the circulating loop section under conditions to effect polymerization thereof;
   a pig for cleaning the tubular reactor;
   a pig receiving station which accommodates the pig between cleaning operations;
   flow control devices operable to connect the pig receiving station to the tubular reactor so that during a cleaning operation the pig leaves the pig receiving station and passes through and cleans both the circulating loop section and the secondary line section of the reactor; and
   wherein the tubular reactor is in fluid communication with a suction side of the pump through an orifice in the wall of the tubular reactor.

2. The polymerization apparatus according to claim 1, wherein the pig does not pass through the pump during cleaning operations.

3. The polymerization apparatus according to claim 1, wherein the size of the orifice is smaller than the size of the pig.

4. The polymerization apparatus according to claim 1, wherein the size of the orifice increases in a downstream direction of the tubular reactor.

5. The polymerization apparatus according to claim 1, wherein a discharge side of the pump is in fluid communication with the circulating loop section by way of a first flow control device and with the pig receiving station through a second flow control device such that, when the first flow control device is open, a polymerizable monomer charge can circulate through the loop section and when the second flow control device is open, at least part of the polymerizable monomer charge can be diverted to the pig receiving station to launch the pig from the pig receiving station.

6. The polymerization apparatus according to claim 1, wherein at least a substantial part of the tubular reactor forms at least one helical coil.

7. The polymerization apparatus of claim 1, wherein the secondary line section has a volume of less than twice, preferably from 50 to 100%, of the volume of the circulating loop section.

8. The polymerization apparatus of claim 1, wherein the pig can pass through the circulating loop section and the secondary line section and back to the pig receiving station without interrupting the polymerization.

9. The polymerization apparatus according to claim 1, wherein the pig is launched from the pig receiving station by diverting the flow from at least one of said inlets.

10. The polymerization apparatus according to claim 1, wherein the pig receiving station is connected to the reactor tube between the outlet of the secondary line section and the start of the loop section.

11. A continuous emulsion polymerization apparatus comprising:
    a tubular reactor comprising (1) a circulating loop section and (2) a secondary line section having one end connected to a discharge opening of the loop section and a polymer outlet at its other end;
    one or more inlets though which a polymerizable monomer charge can be supplied to the tubular reactor;
    a pump for continuously circulating the monomer charge within the circulating loop section under conditions to effect polymerization thereof;
    a pig for cleaning the tubular reactor;
    an orifice in a wall of the tubular reactor allowing the tubular reactor to be in fluid connection with a suction side of the circulation pump;
    a vent line connecting the tubular reactor downstream of the orifice to between the orifice and the circulating pump;
    a pig receiving station which accommodates the pig between cleaning operations; and
    flow control devices operable to connect the pig receiving station to the tubular reactor so that during a cleaning operation the pig leaves the pig receiving station and passes through and cleans both the circulating loop section and the secondary line section of the reactor.

12. The polymerization apparatus of claim 11, wherein the vent line further comprises a valve which is opened as the pig approaches.

13. The polymerization apparatus of claim 11, wherein as the pig passes the orifice, at least some of the reactor charge ahead of the pig passes into said vent line.

14. A continuous emulsion polymerization apparatus comprising:
    a tubular reactor comprising (1) a circulating loop section and (2) a secondary line section having one end connected to a discharge opening of the loop section and a polymer outlet at its other end;
    one or more inlets though which a polymerizable monomer charge can be supplied to the tubular reactor;
    a pump for continuously circulating the monomer charge within the circulating loop section under conditions to effect polymerization thereof;
    a pig for intermittently cleaning the tubular reactor;
    an orifice allowing the tubular reactor to be in fluid connection with a suction side of the circulation pump and positioned on the inner side of a curved portion of the tubular reactor such that the pig does not contract the orifice due to centrifugal force keeping the pig on the outside of said curved portion of the tubular reactor;
    a pig receiving station which accommodates the pig between cleaning operations; and
    flow control devices operable to connect the pig receiving station to the tubular reactor so that during a cleaning operation the pig leaves the pig receiving station and passes through and cleans both the circulating loop section and the secondary line section of the reactor.

15. The polymerization apparatus of claim 14, wherein the orifice is further positioned between the circulating loop section and the secondary line section.

* * * * *